United States Patent
Dong

(10) Patent No.: US 11,360,834 B2
(45) Date of Patent: *Jun. 14, 2022

(54) APPLICATION INTERACTION METHOD AND APPARATUS

(71) Applicant: Beijing Xiaomi Mobile Software Co., Ltd., Beijing (CN)

(72) Inventor: Hongguang Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/207,251

(22) Filed: Mar. 19, 2021

(65) Prior Publication Data

US 2021/0208958 A1 Jul. 8, 2021

Related U.S. Application Data

(63) Continuation of application No. 16/699,416, filed on Nov. 29, 2019, now Pat. No. 10,990,461, which is a
(Continued)

(30) Foreign Application Priority Data

Jun. 14, 2017 (CN) .......................... 201710448714.2
Jun. 14, 2017 (CN) .......................... 201710449172.0
(Continued)

(51) Int. Cl.
*G06F 9/54* (2006.01)
*G06F 9/451* (2018.01)
(Continued)

(52) U.S. Cl.
CPC ................ *G06F 9/546* (2013.01); *G06F 8/61* (2013.01); *G06F 9/451* (2018.02); *H04L 67/28* (2013.01);
(Continued)

(58) Field of Classification Search
CPC . G06F 9/451; G06F 9/54; G06F 9/546; G06F 8/61; G06F 9/4843; H04L 67/28; H04L 67/32; H04L 67/141; H04L 67/34
See application file for complete search history.

(56) References Cited

U.S. PATENT DOCUMENTS 6,094,684 A 7/2000 Pallmann
9,075,508 B1 7/2015 Cronin
(Continued)

FOREIGN PATENT DOCUMENTS

CN 101636998 A 1/2010
CN 101968745 A 2/2011
(Continued)

OTHER PUBLICATIONS

ISA State Intellectual Property Office of the People's Republic of China, International Search Report issued in Application No. PCT/CN2017/114508, dated Mar. 15, 2018, WIPO, 4 pages.
(Continued)

*Primary Examiner* — Tuan C Dao
(74) *Attorney, Agent, or Firm* — Finnegan, Henderson, Farabow, Garrett & Dunner, L.L.P.

(57) ABSTRACT

An application interaction method includes: establishing a virtual network connection between a current application and a preset virtual server; acquiring a target network request passing through an operating system by using the virtual network connection, wherein the target network request indicates a jump from the current application to a target application; extracting a target application parameter from the target network request, wherein the target application parameter includes at least an identifier of the target application; and launching the target application according to the target application parameter.

15 Claims, 8 Drawing Sheets

Related U.S. Application Data continuation of application No. PCT/CN2017/114508, filed on Dec. 4, 2017.

(30) Foreign Application Priority Data

| | | |
|---|---|---|
| Jul. 7, 2017 | (CN) | 201710551720.0 |
| Jul. 7, 2017 | (CN) | 201710552645.X |
| Jul. 7, 2017 | (CN) | 201710552952.8 |
| Jul. 7, 2017 | (CN) | 201710552955.1 |
| Jul. 7, 2017 | (CN) | 201710553136.9 |
| Jul. 7, 2017 | (CN) | 201710553148.1 |

(51) Int. Cl.
*G06F 8/61* (2018.01)
*H04L 67/56* (2022.01)
*H04L 67/60* (2022.01)
*H04L 67/00* (2022.01)
*H04L 67/141* (2022.01)

(52) U.S. Cl.
CPC ............ *H04L 67/32* (2013.01); *H04L 67/34* (2013.01); *H04L 67/141* (2013.01)

(56) References Cited

U.S. PATENT DOCUMENTS

| | | | |
|---|---|---|---|
| 9,348,671 B1 | 5/2016 | Chen | |
| 9,558,051 B1 | 1/2017 | Taylor | |
| 2001/0037387 A1* | 11/2001 | Gilde | H04L 67/1008 709/225 |
| 2003/0041263 A1* | 2/2003 | Devine | H04L 43/06 707/E17.107 |
| 2004/0193512 A1* | 9/2004 | Gobin | G06F 16/972 705/29 |
| 2005/0060412 A1 | 3/2005 | Chebolu et al. | |
| 2005/0188002 A1* | 8/2005 | Yang | H04L 63/029 709/200 |
| 2006/0117172 A1* | 6/2006 | Zhang | G06F 9/4416 713/2 |
| 2010/0279678 A1 | 11/2010 | Li et al. | |
| 2014/0150022 A1 | 5/2014 | Oh et al. | |
| 2014/0229898 A1 | 8/2014 | Terwedo | |
| 2014/0365557 A1 | 12/2014 | Maehara et al. | |
| 2015/0046920 A1* | 2/2015 | Allen | G06F 9/45558 718/1 |
| 2015/0153911 A1 | 6/2015 | Seymour et al. | |
| 2015/0156257 A1 | 6/2015 | Li et al. | |
| 2015/0301873 A1 | 10/2015 | Liang et al. | |
| 2015/0317559 A1 | 11/2015 | Cronin | |
| 2016/0065580 A1* | 3/2016 | Zayed | G06F 21/53 726/15 |
| 2016/0118060 A1 | 4/2016 | Yadav et al. | |
| 2016/0139776 A1 | 5/2016 | Donahue et al. | |
| 2016/0330237 A1* | 11/2016 | Edlabadkar | H04L 63/0281 |
| 2016/0337104 A1* | 11/2016 | Kalligudd | H04W 12/033 |
| 2016/0381115 A1* | 12/2016 | Fujisawa | H04L 67/02 709/203 |
| 2017/0046180 A1 | 2/2017 | Desineni et al. | |
| 2017/0006101 A1 | 3/2017 | Lee et al. | |
| 2017/0116339 A1 | 4/2017 | Stein et al. | |
| 2017/0132023 A1* | 5/2017 | Desineni | G06F 9/44521 |
| 2017/0160883 A1 | 6/2017 | Yuan | |
| 2017/0188213 A1 | 6/2017 | Nirantar et al. | |
| 2017/0289339 A1* | 10/2017 | Riva | H04L 67/10 |
| 2018/0322272 A1* | 11/2018 | Sharma | H04L 29/08135 |
| 2019/0229900 A1* | 7/2019 | Khristi | H04L 9/3228 |

FOREIGN PATENT DOCUMENTS

| | | |
|---|---|---|
| CN | 102123166 A | 7/2011 |
| CN | 102377823 A | 3/2012 |
| CN | 102932375 A | 2/2013 |
| CN | 102981915 A | 3/2013 |
| CN | 103135969 A | 6/2013 |
| CN | 103581878 A | 2/2014 |
| CN | 103823715 A | 5/2014 |
| CN | 103973730 A | 8/2014 |
| CN | 104125258 A | 10/2014 |
| CN | 104238878 A | 12/2014 |
| CN | 104270404 A | 1/2015 |
| CN | 104317648 A | 1/2015 |
| CN | 104364758 A | 2/2015 |
| CN | 104504313 A | 4/2015 |
| CN | 104980512 A | 10/2015 |
| CN | 105094862 A | 11/2015 |
| CN | 105122240 A | 12/2015 |
| CN | 105141709 A | 12/2015 |
| CN | 105302561 A | 2/2016 |
| CN | 105376189 A | 3/2016 |
| CN | 105553942 A | 5/2016 |
| CN | 105574170 A | 5/2016 |
| CN | 105763630 A | 7/2016 |
| CN | 105808725 A | 7/2016 |
| CN | 105915703 A | 8/2016 |
| CN | 105955723 A | 9/2016 |
| CN | 106095549 A | 11/2016 |
| CN | 106126033 A | 11/2016 |
| CN | 106293652 A | 1/2017 |
| CN | 106294372 A | 1/2017 |
| CN | 106325685 A | 1/2017 |
| CN | 106406931 A | 2/2017 |
| CN | 106453766 A | 2/2017 |
| CN | 106469044 A | 3/2017 |
| CN | 106503134 A | 3/2017 |
| CN | 106528657 A | 3/2017 |
| CN | 106599231 A | 4/2017 |
| CN | 106603607 A | 4/2017 |
| CN | 106651522 A | 5/2017 |
| CN | 106681746 A | 5/2017 |
| CN | 106815037 A | 6/2017 |
| CN | 106817420 A | 6/2017 |
| CN | 106844019 A | 6/2017 |
| CN | 110618768 A | 12/2019 |
| JP | 4768375 B2 | 6/2011 |
| WO | WO 2013/039540 A1 | 3/2013 |
| WO | WO 2014/152936 A2 | 9/2014 |

OTHER PUBLICATIONS

English translation of Written Opinion of the International Searching Authority of PCT Application No. PCT/CN2017/114508, dated Mar. 15, 2018, issued by the ISA/CN—State Intellectual Property Office of the P.R. China.
Office Action dated Feb. 3, 2020, in counterpart Chinese Application No. 201710449172.0.
Extended European Search Report for Application No. 17913542.1, dated Apr. 1, 2020.
State Intellectual Property Office of the People's Republic of China, Office Action and Search Report Issued in Application No. 201710448714.2, dated Jul. 29, 2020, 16 pages.
State Intellectual Property Office of the People's Republic of China, Office Action and Search Report Issued in Application No. 201710449172.0, dated Aug. 25, 2020, 15 pages.
State Intellectual Property Office of the People's Republic of China, Office Action and Search Report Issued in Application No. 201710448714.2, dated Mar. 17, 2021, 15 pages.
State Intellectual Property Office of the People's Republic of China, Office Action and Search Report Issued in Application No. 201780002125.X, dated Jun. 30, 2021, 14 pages.
State Intellectual Property Office of the People's Republic of China, Office Action and Search Report Issued in Application No. 201710551720.0, dated Sep. 30, 2020, 8 pages.
Indian Patent Office, Office Action Issued in Application No. 201947051928, dated Jul. 5, 2021, 6 pages.
Second Office Action dated Sep. 8, 2020, from the State Intellectual Property Office of the People's Republic of China, issued in Chinese Application No. 2017105531481.

(56) References Cited

OTHER PUBLICATIONS

Third Office Action dated Aug. 4, 2021, from the State Intellectual Property Office of the People's Republic of China issued in Chinese Application No. 201710448714.2.
Office Action dated Aug. 24, 2021, from the European Patent Office issued in European Application No. 17913542.1.
Nan Shen, "Research and Implementation of Database Service Virtualization in Distributed System", Document No. 1000405114195, China Excellent Master's Thesis Full-text Database Information Technology Series, Dec. 15, 2011, 75 pages.
Chen, X., "Research on User Identity Authentication Technology for Virtual Laboratory System," 2015 Sixth International Conference on Intelligent Systems Design and Engineering Applications, May 2, 2016, pp. 688-691.
Hu, Song et al., "Design and Implementation of Virtual Interact Plat Based on Mobile Network Environment: in Case of Virtual Olympic Scene", Journal of Tianjin Institute of Urban Construction, vol. 14, No. 1, Mar. 2008, 5 pages.
Zhu, Xiuchang et al., "Network delivery over HTTP for video streaming", Journal of Nanjing University of Posts and Telecommunications (Natural Science Edition), vol. 36, No. 3, Jun. 30, 2016, 9 pages.
Bai, Lili et al., "Analysing Indirect Jump based on Critical Semantic Subtree", 2010 International Conference on Computer Design and Applications (ICCDA 2010), Aug. 5, 2010, 5 pages.
Office Action dated Feb. 7, 2022, from the State Intellectual Property Office of the People's Republic of China, issued in counterpart Chinese Application No. 201780002125.X.

\* cited by examiner

APPLICATION INTERACTION METHOD AND APPARATUS

CROSS REFERENCE TO RELATED APPLICATIONS

The present disclosure is a continuation of U.S. application Ser. No. 16/699,416, filed on Nov. 29, 2019 and now issued as U.S. Pat. No. 10,990,461, which is a continuation of International Application No. PCT/CN2017/114508, filed on Dec. 4, 2017, which is based on and claims priority to eight Chinese patent applications, which are 201710448714.2 filed on Jun. 14, 2017, 201710449172.0 filed on Jun. 14, 2017, 201710553148.1 filed on Jul. 7, 2017, 201710552952.8 filed on Jul. 7, 2017, 201710552645.X filed on Jul. 7, 2017, 201710553136.9 filed on Jul. 7, 2017, 201710552955.1 filed on Jul. 7, 2017, and 201710551720.0 filed on Jul. 7, 2017. The contents of all the above-referenced applications are incorporated herein by reference in their entirety.

TECHNICAL FIELD

The present disclosure relates to the field of communication technologies, and in particular, to an application interaction method and apparatus.

BACKGROUND

With the development of computer communication technology, all kinds of application software have brought people excellent communication experiences. Jumping and turning from one application to another can be made available by using Deeplink technology. For example, in the case where application A is configured with Deeplink technology, when a user triggers a link in application A for jumping and turning to another application, it is possible to jump and turn to an internal page of another application, for example, application B, through the Deeplink technology. However, if application A is not adapted with the Deeplink technology, page jump between applications as described above is not available, which affects user experience of the terminal device.

SUMMARY

In view of this, the present disclosure provides an application interaction method and apparatus, which make jumps between applications available without being limited by whether an application is or is not configured with the Deeplink technology.

According to a first aspect of examples of the present disclosure, an application interaction method includes: establishing a virtual network connection between a current application and a preset virtual server; acquiring a target network request passing through an operating system by using the virtual network connection, wherein the target network request indicates a jump from the current application to a target application; extracting a target application parameter from the target network request, wherein the target application parameter includes at least an identifier of the target application; and launching the target application according to the target application parameter.

According to a second aspect of examples of the present disclosure, an application interaction apparatus includes: a processor; and a memory for storing instructions executable by the processor, wherein the processor is configured to: establish a virtual network connection between a current application and a preset virtual server; acquire a target network request passing through an operating system by using the virtual network connection, wherein the target network request indicates a jump from the current application to a target application; extract a target application parameter from the target network request, wherein the target application parameter includes at least an identifier of the target application; and launch the target application according to the target application parameter.

The technical solutions provided by the examples of the present disclosure may have the following beneficial effects:

By using the application interaction methods provided in the present disclosure, when the user tries to jump from an interface of the current application to another target application, in the case that the two applications are not configured with the DeepLink technology, a message from the current application is monitored by taking the operating system of the terminal as a medium, and a target message containing a target application parameter is identified from the message, so as to extract the target application parameter. A quick and accurate jump to the target application is made available by using the target application parameter, without being limited by whether an application is or is not configured with the Deeplink technology. In this way, the process of human-computer interaction between the user and the terminal can be simplified and time is saved, which not only improves the interaction efficiency between applications but also ensures the accuracy of jumps to the target application, thereby improving the user experience at the terminal.

It is to be understood that the above general description and the following detailed description are intended to be illustrative and explanatory, but not restrictive of the present disclosure.

BRIEF DESCRIPTION OF DRAWINGS

The accompanying drawings, which are incorporated in and form part of the specification, show examples consistent with the present disclosure and serve to explain the principles of the present disclosure together with the specification.

DETAILED DESCRIPTION

Figure 1:
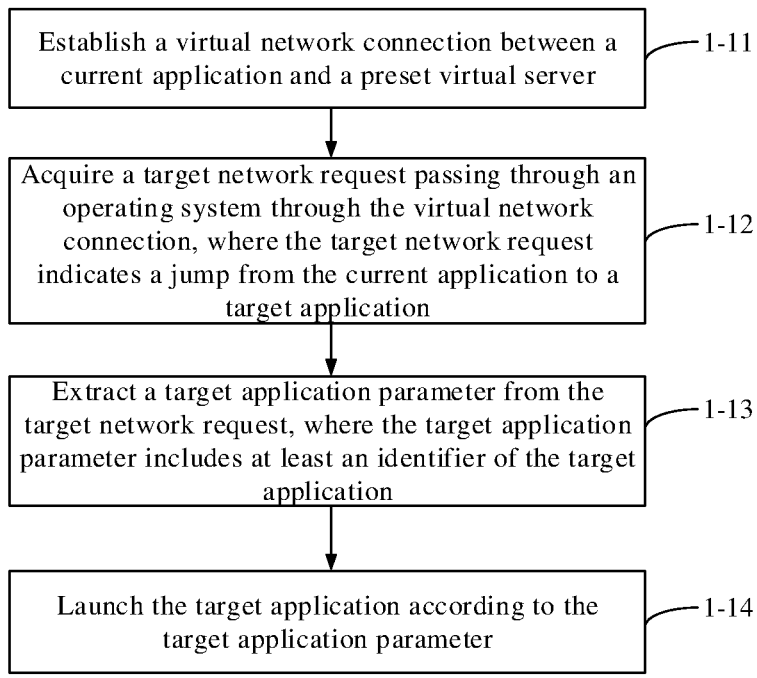
FIG. 1 is a flowchart of an application interaction method according to an example of the present disclosure.

Examples will be described in detail herein, with illustrations thereof represented in the drawings. When drawings are involved in the description below, like numerals in different drawings refers to like or similar elements unless otherwise indicated. The embodiments described in the following examples do not represent all embodiments consistent with the present disclosure. Instead, they are merely examples of apparatuses and methods consistent with some aspects of the present disclosure as detailed in the appended claims.

FIG. 1 is a flowchart of an application interaction method according to an example. The method may include steps 1-11 to 1-14.

At step 1-11, a virtual network connection is established between a current application and a preset virtual server.

In an example of the present disclosure, the current application may be any of the various applications installed in a user terminal. For example, the current application belongs to a first type application in the related art, and downloading and installation of the first type application require user's confirmation. In other words, installation package or update data package of the first type application will only be downloaded or installed when a confirmation message triggered by the user is received. The first type application mentioned above may be a browser, or an instant messaging application such as MiTalk, WeChat, and the like.

The current application may also be of a different type, for example a new application, which is installed and downloaded without user's confirmation.

According to provision of the TCP (Transmission Control Protocol), if a current application is to send a network request, a reliable network connection with the network server is required to be established first. After that, it is possible for the target network request to be monitored by the operating system.

Since the present disclosure mainly aims to make the target network request monitored by the operating system, it is not taken into account whether a receiving party of the network request returns requested information to the current application. Therefore, a virtual network server can be preset, so that the current application may establish a virtual network connection with the virtual network server.

In an example of the present disclosure, the current application may be an application that can request access to the network, such as a web browser or a web proxy service program, where the network proxy service program may be an instant messaging application such as MiTalk, WeChat, QQ, etc., or other applications that can request access to the network.

The virtual server may be an HTTP (Hyper Text Transfer Protocol) server set in the user terminal locally. The current application may establish a virtual TCP connection with the local HTTP server.

The application interaction method provided by the present disclosure will be described in detail below with reference to an example in which the current application is a web browser, the virtual server is virtual HTTP server locally provided.

In an example of the present disclosure, when establishing a virtual TCP connection between the current application and the virtual HTTP server, step 1-11 may be implemented in the following three cases.

Figure 2:
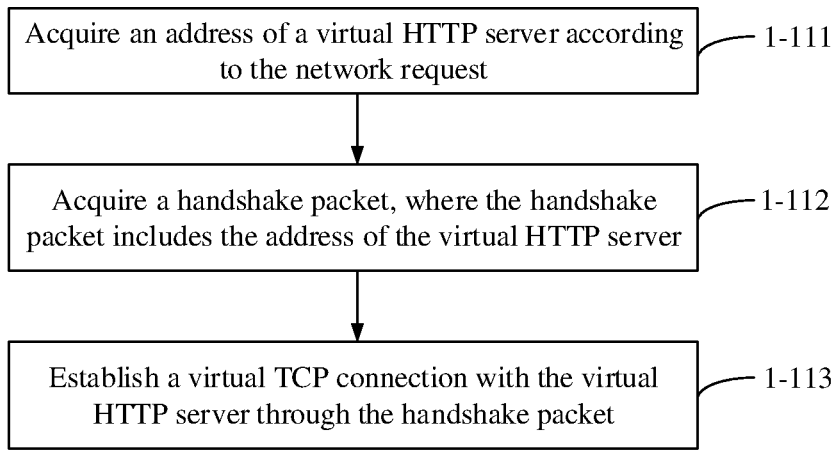
FIG. 2 is a flowchart of another application interaction method according to an example of the present disclosure.

In the first case, with reference to FIG. 2, a flowchart of another application interaction method according to an example, step 1-11 may include steps 1-111 to 1-113.

At step 1-111, an address of a virtual HTTP server is acquired according to the network request.

According to the related knowledge, before sending an HTTP request to a normal web server, a web server may need to first establish a stable TCP connection through three handshakes. After the TCP connection is successfully established, an HTTP request is sent to the remote web server.

In an example of the present disclosure, by establishing the virtual TCP connection through the preset local HTTP server previously provided in the user terminal, the web browser may subsequently send an HTTP request to the virtual HTTP server through the operating system, so that a preset monitoring service may acquire the HTTP request.

In establishing the virtual TCP connection, an address of the virtual HTTP server can be acquired according to the network request in the following manner.

Figure 3:
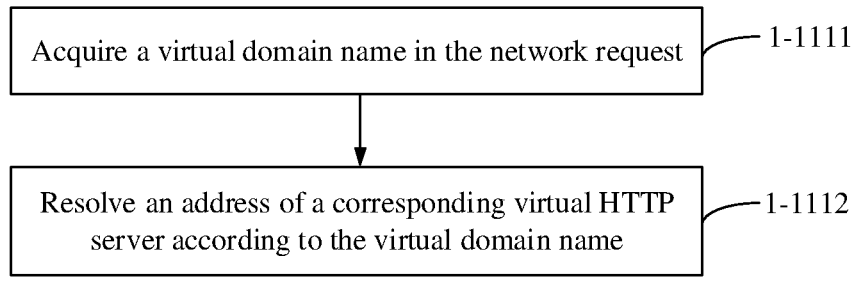
FIG. 3 is a flowchart of another application interaction method according to an example of the present disclosure.

The address of the virtual HTTP server is not directly included in the network request sent by the browser. FIG. 3 is a flowchart of another application interaction method according to an example. Step 1-111 may include steps 1-1111 to 1-1112.

At step 1-1111, a virtual domain name in the network request is acquired.

Figure 4:
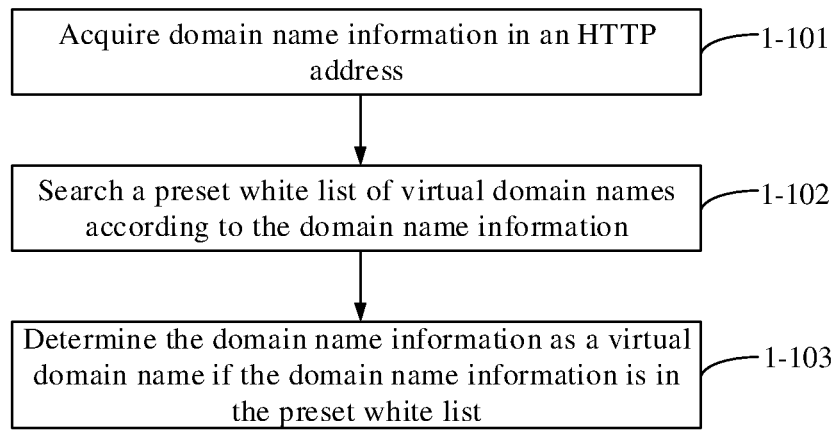
FIG. 4 is a flowchart of another application interaction method according to an example of the present disclosure.

FIG. 4 is a flowchart of another application interaction method according to an example. Step 1-1111 may include steps 1-101 to 1-103.

At step 1-101, domain name information in an HTTP address is acquired.

For example, when the user clicks on a network link in a page of the web browser (it is assumed that an address of the network link, i.e., the HTTP address, is http://abc.com/efg****), the web browser first acquires the domain name information in the HTTP address (i.e., abc.com), and sends the domain name information "abc.com" to a DNS (Domain Name System) module of the user terminal.

At step 1-102, a preset white list of virtual domain names is searched according to the domain name information.

In an example of the present disclosure, a white list of virtual domain names may be preset in the user terminal, and the white list records all virtual domain name information. The DNS module may use the white list of virtual domain names to determine whether a domain name sent by the browser is a virtual domain name.

At step 1-103, if the domain name information is in the preset white list of virtual domain names, it is determined that the domain name information is a virtual domain name.

If the DNS module finds "abc.com" from the preset white list of virtual domain names, it is determined that the domain name "abc.com" is a virtual domain name In other words, a web server the domain name points to does not physically exist.

At step 1-1112, an address of a corresponding virtual HTTP server is resolved according to the virtual domain name.

In an example of the present disclosure, a list may be preset in the DNS module, and the preset list contains the correspondence between addresses of the virtual HTTP servers and virtual domain names. For example, as shown in Table 1:

TABLE 1

| Virtual domain name | Address of virtual HTTP server |
|---|---|
| abc.com | 127.0.0.1 |

The DNS module may search table 1 according to the virtual domain name "abc.com", and determine the address of the corresponding virtual HTTP server as 127.0.0.1. The address is then returned to the browser so that the browser may take the address as a destination address and send a handshake packet to the address.

At step 1-112, a handshake packet is acquired, where the handshake packet includes the address of the virtual HTTP server.

After acquiring the address of the virtual HTTP server corresponding to "abc.com" (it is assumed that the address is 127.0.0.1), the web browser sends out a TCP handshake packet with the address of the HTTP server. The TCP handshake packet contains the address 127.0.0.1.

At step 1-113, a virtual TCP connection is established with the virtual HTTP server through the handshake packet.

After receiving the handshake packet, the local virtual HTTP server returns a response message to the web browser, and thus a handshake process is completed.

In the TCP/IP protocol, the TCP protocol requires to provide a reliable connection service through three handshakes. In the subsequent two handshakes, steps 1-111 to 1-113 are repeated. After three handshakes all succeed, the virtual TCP connection is successfully established.

Figure 5:
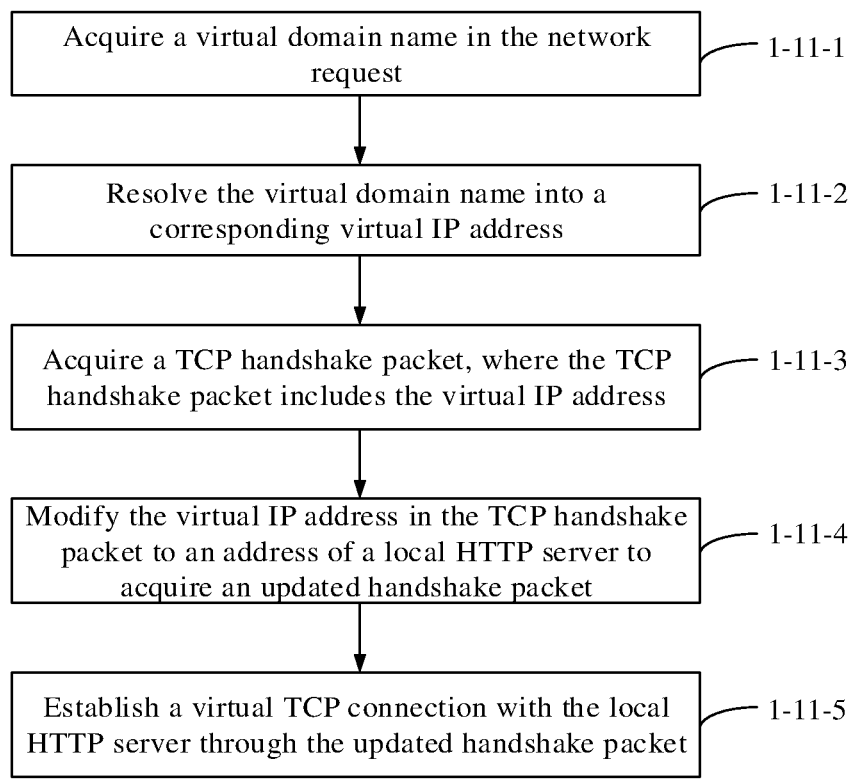
FIG. 5 is a flowchart of another application interaction method according to an example of the present disclosure.

In the second case, with reference to FIG. 5, a flowchart of another application interaction method according to an example, step 1-11 may include steps 1-11-1 to 1-11-5:

At step 1-11-1, a virtual domain name in the network request is acquired.

This step is implemented similarly to step 1-1111, and details are not described herein again.

At step 1-11-2, the virtual domain name is resolved into a corresponding virtual IP address.

After determining that the domain name "abc.com" is a virtual domain name, the DNS module may output a virtual IP address according to a preset virtual IP address list, and send the virtual IP address to the web browser. The virtual IP address list contains the correspondence between virtual domain names and virtual IP addresses. For example, as shown in Table 2:

TABLE 2

| Virtual domain name | Virtual IP address |
|---|---|
| abc.com | 1.2.3.4 |

The DNS module searches Table 2 according to the domain name "abc.com" and outputs a corresponding virtual IP address 1.2.3.4.

At step 1-11-3, a TCP handshake packet is acquired, where the TCP handshake packet includes the virtual IP address.

After acquiring the address of the virtual IP address corresponding to "abc.com" (it is assumed that the virtual IP address is 1.2.3.4), the web browser sends out a TCP handshake packet with the virtual IP address. The TCP handshake packet contains the virtual IP address 1.2.3.4.

According to related knowledge, as a bridge for upper layer application software to send messages to remote servers, the operating system may acquire messages sent by various applications. Therefore, when passing through the operating system, the TCP handshake packet sent by the web browser can be acquired by a monitoring component preset in the operating system, such as a firewall component.

At step 1-11-4, the virtual IP address in the TCP handshake packet is modified to an address of a local HTTP server, so that an updated handshake packet is acquired.

A firewall is still taken as an example of the monitoring component in the operating system. In an example of the present disclosure, the correspondence between virtual IP addresses and addresses of local virtual HTTP servers is pre-stored in the user terminal, as shown in Table 2:

TABLE 3

| Virtual IP address | Address of virtual HTTP server |
|---|---|
| 1.2.3.4 | 127.0.0.1 |

The firewall can search Table 3, modify the IP address (1.2.3.4) in the original TCP handshake packet from the web browser to the address of the local virtual HTTP server (127.0.0.1), and then send the modified TCP handshake packet, i.e., the updated handshake packet, to the virtual HTTP server.

At step 1-11-5, a virtual TCP connection is established with the virtual HTTP server through the updated handshake packet.

After receiving the updated handshake packet, the local virtual HTTP server returns a response message to the web browser, and thus a handshake process is completed.

In the TCP/IP protocol, the TCP protocol requires to provide a reliable connection service through three handshakes. In the subsequent two handshakes, steps 1-11-1 to 1-11-5 are repeated. After three handshakes all succeed, the virtual TCP connection is successfully established.

In the third case, the network request sent by the browser (e.g., a URL) directly contains the address of the virtual HTTP server (e.g., http://127.0.0.1/efg****). The browser may extract the address of the preset local virtual HTTP server from the network request, and then send the handshake packet.

In this case, the handshake packet sent by the browser includes the address of the preset virtual HTTP server, 127.0.0.1. The handshake packet does not need to undergo a domain name resolution by the DNS module, nor any information processing by the firewall, but is directly sent to the preset local virtual HTTP server. In other words, when establishing a virtual TCP connection between the current application and the virtual HTTP server, there is no need to perform any processing on the handshake packet. Compared to the first two cases, the third case may speed up the creation of message channels for sending messages through the operating system.

At step 1-12, a target network request passing through an operating system is acquired through the virtual network connection, where the target network request indicates a jump from the current application to a target application.

In an example of the present disclosure, the target network request includes preset feature information and a target application parameter.

The preset feature information is for determining whether a network request contains a target application parameter, which may be a preset keyword, a preset encoding method, or the like. The preset feature information may be provided by provider of the target application and embedded in the user terminal in advance.

The target application parameter includes at least an identifier of the target application, which may be represented as an APP ID, and may further include other information, such as: a page name, i.e., a name of a detail page; a page parameter, i.e., a parameter of a detail page; or an instruction parameter, according to which the target application performs a corresponding operation, such as popping up a dialog box, opening a specified audio file or a video file, etc. The present disclosure does not limit the target application parameter.

In an example of the present disclosure, the target network request may be a target HTTP request passing through the operating system and acquired through a virtual TCP connection. The carrier of the target HTTP request may be a URL, such as an HTTP address.

Figure 6:
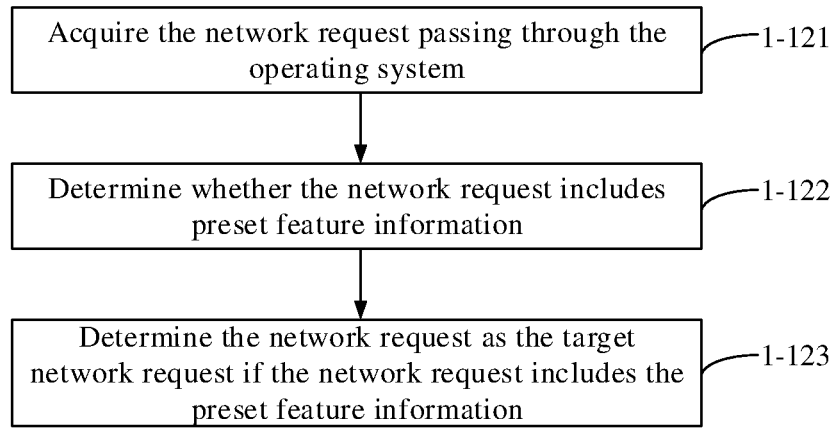
FIG. 6 is a flowchart of another application interaction method according to an example of the present disclosure.

FIG. 6 is a flowchart of another application interaction method according to an example. At step 1-12, a target network request passing through an operating system is acquired, which may include steps 1-121 to 1-123.

At step 1-121, the network request passing through the operating system is acquired.

As shown above, once a TCP connection is established, the web browser sends a network request, such as an HTTP request to a virtual web server with the domain name "abc.com". When passing through the operating system, the HTTP request can be acquired by a monitoring component provided in the operating system, such as a firewall.

At step 1-122, it is determined whether the network request includes preset feature information.

The web browser can send various HTTP requests to the outside. Depending on the requesting method, the HTTP request may be of any of the methods: GET, POST, HEAD, OPTIONS, PUT, DELETE, TRACE, or the like. A GET request packet is taken as an example. The request data may or may not contain the target application parameter. Therefore, the firewall component needs to primarily determine whether the currently acquired packet contains the target application parameter according to a preset policy.

In an example of the present disclosure, the firewall component may identify the target network request by determining whether the request packet includes the preset feature information. The preset feature information is for determining whether an HTTP request contains a target application parameter, which may be a preset keyword, a preset encoding method, or the like. The preset feature information may be provided by provider of the target application and embedded in the user terminal in advance.

It is assumed that the preset feature information is a preset keyword, which may be a preset tag, a preset string (such as "111") and the like. After acquiring the HTTP request, the firewall may determine whether the request includes the preset keyword. If it does, step 1-123 is performed. If the current request includes the preset keyword, the HTTP request is determined as an invalid message.

At step 1-123, if the network request includes the preset feature information, the network request is determined as the target network request.

As shown above, if the HTTP request includes the preset feature information, it is determined that the HTTP request belongs to the target HTTP request.

At step 1-13, a target application parameter is extracted from the target network request, where the target application parameter includes at least an identifier of the target application.

Figure 7:
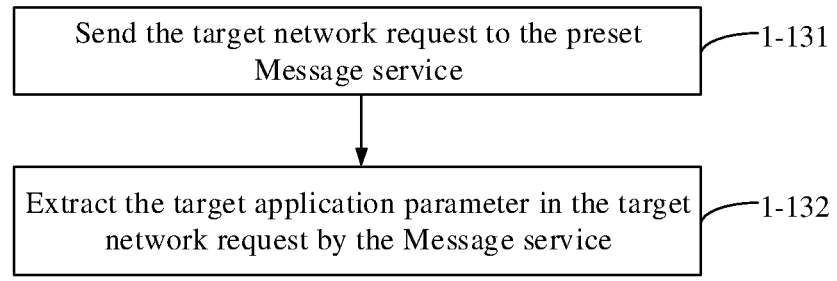
FIG. 7 is a flowchart of another application interaction method according to an example of the present disclosure.

FIG. 7 is a flowchart of another application interaction method according to an example. Step 1-13 may include steps 1-131 to 1-132.

At step 1-131, the target network request is sent to the preset Message service.

In an example of the present disclosure, after identifying the target message, the monitoring component of the operating system may send the packet of the target message to a preset Message service for analyzing. In this way, the identification process is decoupled from the analyzing process, or in other words, the monitoring component serves only to identify the target message but not to analyze the packet of the target message, thereby improving the detection efficiency of the target message.

In an example of the present disclosure, the monitoring component may be a firewall component. Since the firewall component is an original monitoring component in the operating system, a simple parametric configuration (such as configuring the preset feature information) to the firewall component is sufficient to endow the firewall with the ability of identifying the target message. In this way, there is no need to additionally provide a new monitoring component to the operating system and it can save system resources.

Depending on whether the firewall component performs further processing on the target network request, two cases may exist, as described below.

In the first case, the firewall component does not perform further processing on the original target network request and sends the request to the Message service.

In other words, the packet of the target network request determined at step 1-123 does not undergo any processing by the firewall component, and is directly or indirectly sent to the Message service. That is to say, the target network request (e.g., the target HTTP request) sent to the Message service also includes the preset feature information.

Figure 8:
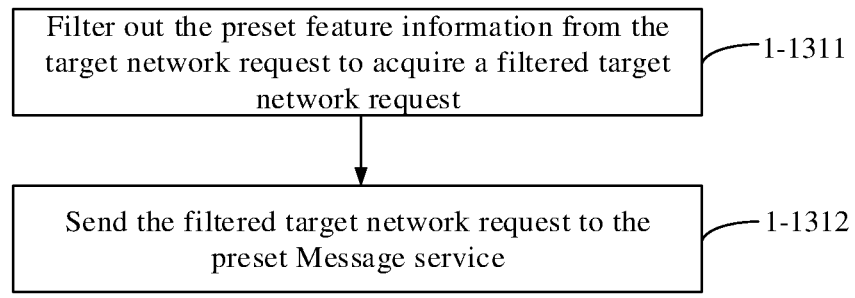
FIG. 8 is a flowchart of another application interaction method according to an example of the present disclosure.

In the second case, the firewall component performs a redundancy removal processing on the target network request, and then sends the request to the Message service. FIG. 8 is a flowchart of another application interaction method according to an example. Step 1-131 may include steps 1-1311 to 1-1312.

At step 1-1311, the preset feature information is filtered out from the target network request, to acquire a filtered target network request.

In an example of the present disclosure, after determining the target HTTP request according to the preset feature information, the firewall may further remove the preset feature information in the target HTTP request, to acquire a filtered target HTTP request.

At step 1-1312, the filtered target network request is sent to the preset Message service.

The preset feature information is mainly for the identification of the HTTP request. In subsequent information processing process, the preset feature information becomes redundant information. Therefore, in an example of the present disclosure, the preset feature information in the original HTTP request may be removed before the request is sent to the Message service, thereby reducing the burden of data processing of the Message service and improving information processing efficiency of the Message service.

For the above two cases, the target network request may be sent to the Message service in any of the following manners, where the target network request may be the original target HTTP request, or the filtered target HTTP request acquired at step 1-1311.

In the first manner, the firewall component intercepts the packet of the target network request and forwards the packet to the Message service.

In an example of the present disclosure, it may not be of interest whether the local virtual HTTP server returns a response message for the target HTTP request. Therefore, the firewall component intercepts the target HTTP request and forwards the request to the Message service.

In the second manner, the firewall component makes a copy of the packet of the target network request and sends the copy to the Message service.

On the other hand, the firewall component also allows the packet of the target network request to pass through normally and send the packet to the virtual server.

In the third manner, the firewall component allows the packet of target network request to pass through normally, and sends the packet to the local virtual server, and the local virtual server sends the packet of the target network request to the Message service.

The target HTTP request is again taken as an example of the target network request. In the third manner, when releasing the packet of the target HTTP request, the firewall component may add a simple mark (e.g., character "M") to the packet of the target HTTP request, so that after detecting that the packet of the target HTTP request is marked with "M", the local HTTP server may send the packet of the target HTTP request to the Message service.

At step 1-132, the target application parameter in the target network request is extracted by the Message service.

In an example of the present disclosure, the Message service may analyze the packet of the target network request, and extract a target application parameter from the information obtained from analysis.

In addition, the Message service may record the target application parameters in a unified format (for example, a string of a fixed length), so that the target application parameters in the preset format are acquired. It is assumed that the parameters are recorded in three bytes, with length of each byte being generally 8 bits. The first byte is used to record the identifier of the target application. The second byte is used to record the page name. The third byte is used to record the page parameter. If one of the parameters is empty, all bits of its corresponding byte are set to zero. It can be understood that the number of bytes occupied by any one of the preset parameters is set according to the maximum data size of the parameter, and should not be limited to one.

The Message service outputs the target application parameters in a unified format, which can facilitate a subsequent application platform to open a page of the target application according to the parameters, thereby improving the efficiency in launching applications.

Figure 9:
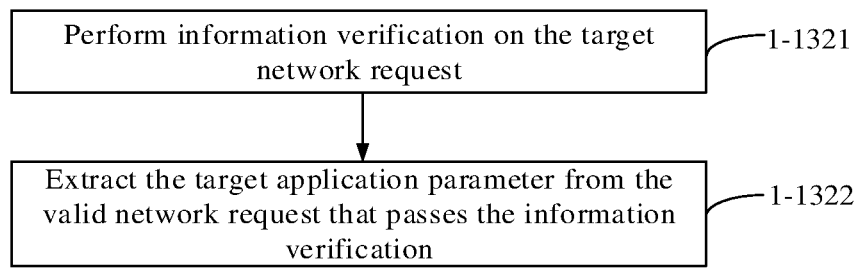
FIG. 9 is a flowchart of another application interaction method according to an example of the present disclosure.

In another example of the present disclosure, before the target application parameters are extracted by the Message service, information verification may be first performed on the packet of the network request. FIG. 9 is a flowchart of another application interaction method according to an example. Step 1-132 may include steps 1-1321 to 1-1322.

At step 1-1321, information verification is performed on the target network request.

In an example of the present disclosure, it should be noted that a HTTP request that does not include the target application parameter may also include the preset feature information, for example a preset keyword. In other words, the packet of the target network request determined at step 1-123 does not necessarily include the target application parameter.

After receiving the packet of the target HTTP request sent by the firewall, the Message service may further perform information verification on the packet of the target HTTP request according to a preset policy. For example, the Message service may determine whether the target network request obtained from analysis includes a preset field (such as a field "APP ID:"), and decide that the target network request passes the information verification when it does.

Alternatively, in the case where the target application parameter is encoded in a preset encoding method, the Message service may further decode the target network request by using a preset decoding method and then verify it. The preset encoding and decoding methods may be provided by the provider of the target application and set in the Message service.

The packet of the network request is generated as follows: a web browser encodes request data containing the target application parameter according to a preset encoding method provided by the provider of the target application, so as to generate the packet of the HTTP request.

If the Message service successfully decodes the packet of the target HTTP request by using the preset decoding method, then the packet of the target HTTP request is a valid HTTP request, i.e., a valid network request. The preset encoding and decoding methods are provided by the provider of the target application and are set in the Message service.

At step 1-1322, the target application parameter is extracted from the valid network request that passes the information verification.

In an example of the present disclosure, to ensure that the HTTP request is accurately determined and to reduce the size of data to be analyzed subsequently, after receiving the packet of the target HTTP request sent by lower level of the system, the Message service built in the user terminal may further perform information verification on the target HTTP request before analyzing for the target application parameter. In this way, it is guaranteed that the request to be subsequently analyzed includes a target application parameter.

At step 1-14, the target application is launched according to the target application parameter.

The target application may belong to the first type application or a new application. The difference between a new application and a first type application is that a new application is installed and downloaded without confirmation for the user, and the downloading and installation process is in background of the user terminal.

In other words, after being acquired by the user terminal, a compressed package of the new application may be automatically installed or updated in the background, with both its installation process and update process not visible to the user in the foreground.

If the target application belongs to the first type application, and the target application has been installed in the user terminal, step 1-14 may be implemented specifically as follows.

According to the identifier of the target application in the target application parameter, the operating system launches the target application, opening, for example, a home page, a login page or a registration page of the target application.

In the case where the target application parameter further includes other information, the launched target application may also perform corresponding operations according to such information, such as opening an inner page in the target application (e.g., a detail page of a sales item in an e-commerce platform); playing an audio file, a video file, etc. in a preset interface; or popping up a preset dialog box.

If the target application is not installed in the user terminal, an application store or the like may be launched so as to prompt the user to download and install the target application. Otherwise, the target message may be discarded.

Figure 10:
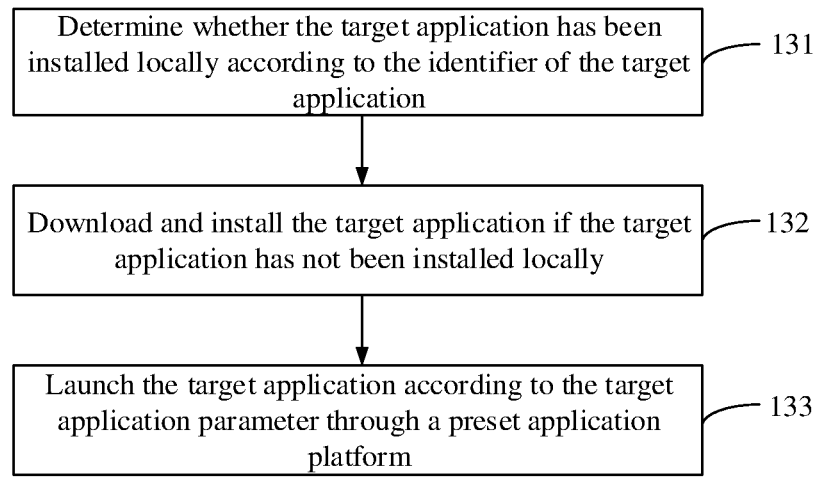
FIG. 10 is a flowchart of another application interaction method according to an example of the present disclosure.

FIG. 10 is a flowchart of another application interaction method according to an example. If the target application belongs to the new application, step 1-14 may include steps 131 to 133.

At step 131, according to the identifier of the target application, it is determined whether the target application has been installed locally.

In an example of the present disclosure, the user terminal may determine whether the new application has been installed locally according to the identifier of the target application through a preset new application platform, or, new application service software. For example, by searching a list of newly installed applications according to the identifier of the target application, it may be determined whether the target new application has been installed locally.

At step 132, if the target application has not been installed locally, the target application is downloaded and installed.

If it is determined that the target new application has not been installed locally, the new application platform may trigger the user terminal to automatically download and install the target new application. Such process is invisible to the user, that is, downloading and installation process is executed without taking receiving a confirmation message triggered by the user in the foreground as a necessary condition.

At step 133, the target application is launched according to the target application parameter through a preset application platform.

After acquiring an installation package or an update data package of a new application, the preset application platform may launch the target new application by directly running the new application program.

In an example of the present disclosure, the preset application platform is a service program preset in the user terminal, and the new application platform may be set in the operating system as system software; still taking a smart phone as an example of the user terminal, the new application platform may be set when the phone is shipped from factory. The preset application platform may also be independently operated in the user terminal as upper layer application software, and the present disclosure does not limit the setting position thereof.

The preset application platform may launch a corresponding target application (i.e., a new application), according to the application parameter of any type of target application. The process of the application platform launching a new application may be implemented as directly launching installation or update package of the new application, opening an interface of the new application specified by the target application parameter (e.g., a home page of the new application), or an inner page thereof.

As an example, it is assumed that the preset application platform at step 133 is a service program C which runs a plurality of new applications, and the target application is a new application named Kuaikan Manhua. In this case, the service program C may directly launch the application Kuaikan Manhua according to the acquired target application parameter, e.g., the identifier of Kuaikan Manhua.

Figure 11:
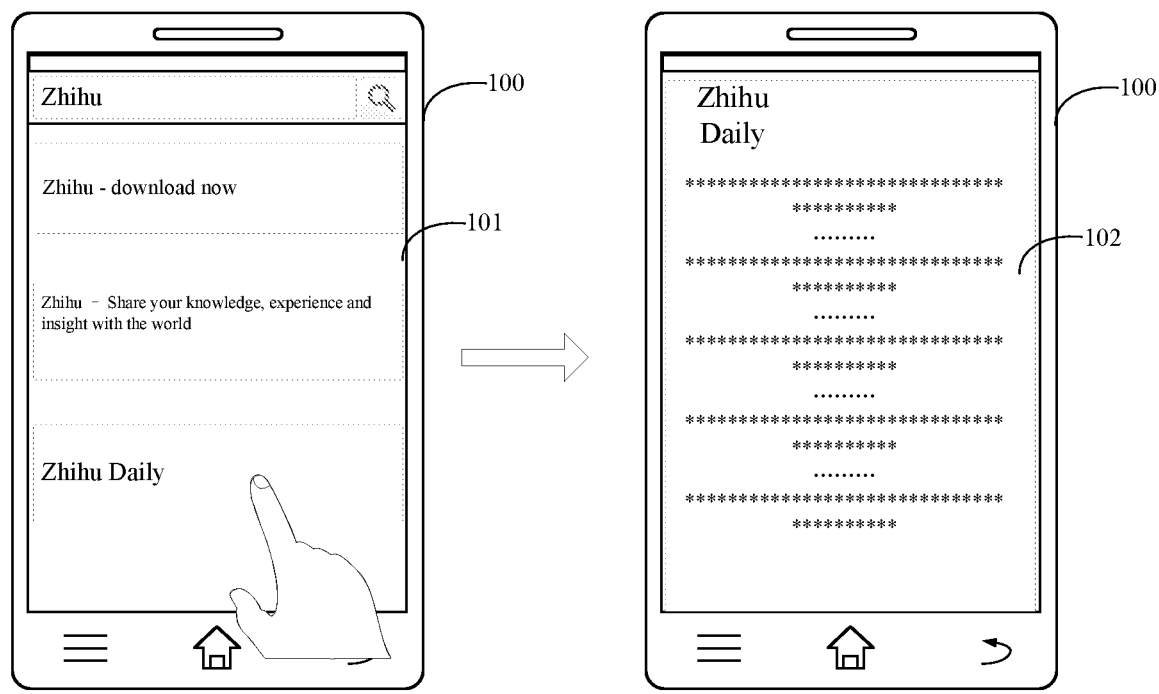
FIG. 11 is a schematic diagram of an application interaction scenario according to an example of the present disclosure.

FIG. 11 is a schematic diagram of an application interaction scenario according to an example. When the user clicks on a link to a page of the target application (e.g., a link to Zhihu Daily) in a browser page 101 of a smart phone 100, the browser page may execute a JS (JavaScript) script in the background. The JS script may generate a target message according to the target application parameters and the preset feature information, for example, the JS script puts together the identifier of the target application, the parameter of the detail page, etc., and the preset feature information into a URL string. The JS script sends the message passing through the operating system (e.g., the URL string) through a system interface. The message is monitored, identified, and determined as the target message, when it passes through the firewall component of the operating system. The firewall component sends the target message to the Message service for extracting the target application parameters. Then, the Message service sends the target application parameters to a preset application platform (i.e., the target application platform). Finally, the preset application platform opens a detail page of the application Zhihu (e.g., detail page 102 of Zhihu Daily) according to the target application parameters, and presents the detail page to the user.

Figure 12:
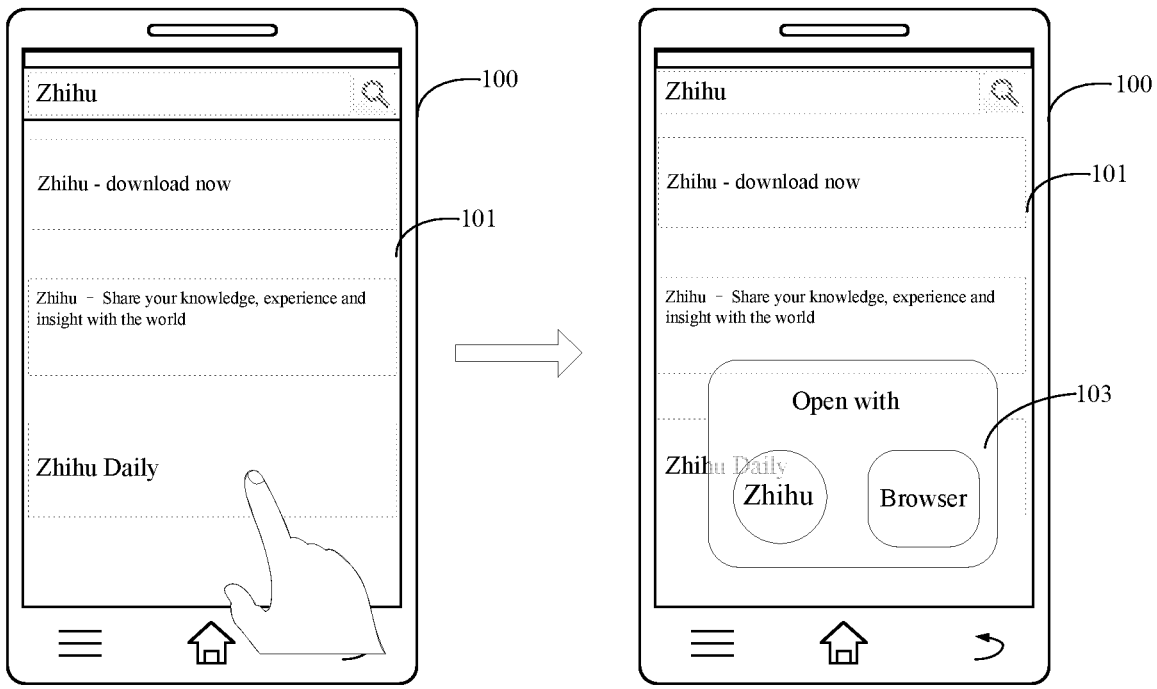
FIG. 12 is a schematic diagram of an application interaction scenario according to related art.

FIG. 12 is a schematic diagram of an application interaction method in related art. In the related art, if a link to Zhihu Daily is clicked in the browser page 101, the user is not shown directly the page of the target application, i.e., Zhihu Daily of the application Zhihu Instead, according to the Deeplink technology with which the browser is configured, a floating window 103 prompting the user to select a method to open the page pops up in the browser. If the browser is not configured with the Deeplink technology, it is impossible to jump from the browser to the application Zhihu.

It can be seen that, by using the application interaction method provided by the present disclosure, when the user tries to jump from one application interface to another target application, the operating system of the terminal can detect the target message which contains a target application parameter, and send the target application parameter to the preset application platform, which is used to open the target application for the user. In this way, direct jump from the current application to the target application without considering whether the Deeplink technology is supported by both applications is made possible, which makes no demand on version or configuration (i.e., compatibility) of both applications, and improves user experience of the terminal device. Moreover, in the case where the target application belongs to the new application, during the process of launching the application, the process of interaction between the user and the terminal can be simplified and time can be saved, and user experience of the terminal device is further improved.

For simplicity of description, the foregoing method examples are all expressed as a series of actions, but those skilled in the art should understand that the present disclosure is not limited by the described order of actions, because according to the present disclosure, some steps can be performed in a different order or at the same time.

In addition, those skilled in the art should also understand that the examples described in the specification are optional, and actions and modules involved are not necessarily required by the disclosure.

Correspondingly to the foregoing examples of methods to implement the application methods, the present disclosure also provides examples of apparatuses to implement the application methods and corresponding terminals.

Figure 13:
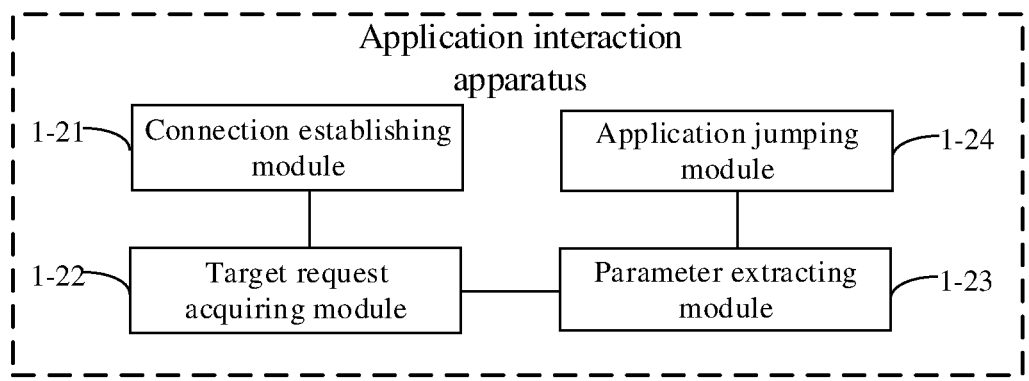
FIG. 13 is a block diagram of an application interaction apparatus according to an example of the present disclosure.

FIG. 13 is a block diagram of an application interaction apparatus according to an example. The apparatus may include:

a connection establishing module 1-21, configured to establish a virtual network connection between a current application and a preset virtual server;

a target request acquiring module 1-22, configured to acquire, through the virtual network connection, a target network request passing through an operating system, where the target network request is for jumping to a target application;

a parameter extracting module 1-23, configured to extract a target application parameter from the target network request, where the target application parameter includes at least an identifier of the target application; and an application jumping module 1-24, configured to launch the target application according to the target application parameter.

Figure 14:
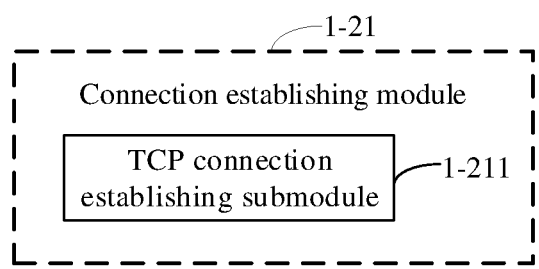
FIG. 14 is a block diagram of another application interaction apparatus according to an example of the present disclosure.

FIG. 14 is a block diagram of another application interaction apparatus according to an example. On the basis of the apparatus example shown in FIG. 13, the connection establishing module 1-21 may include:

a TCP connection establishing submodule 1-211, configured to establish a virtual TCP connection between a current application and a preset virtual server.

Correspondingly, the target request acquiring module 1-22 may be configured to acquire, through the virtual TCP connection, a target HTTP request passing through an operating system.

Figure 15:
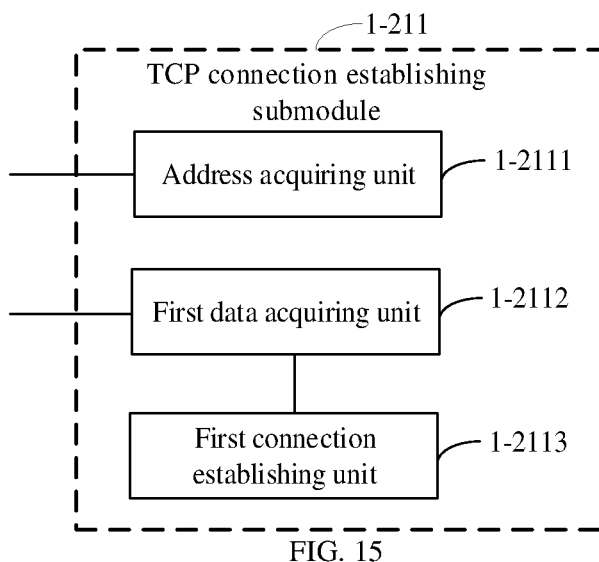
FIG. 15 is a block diagram of another application interaction apparatus according to an example of the present disclosure.

FIG. 15 is a block diagram of another application interaction apparatus according to an example. On the basis of the apparatus example shown in FIG. 14, the TCP connection establishing submodule 1-211 may include:

an address acquiring unit 1-2111, configured to acquire an address of a virtual HTTP server according to the network request;

a first data acquiring unit 1-2112, configured to acquire a handshake packet, where the handshake packet includes the address of the virtual HTTP server; and a first connection establishing unit 1-2113, configured to establish a virtual TCP connection with the virtual HTTP server through the handshake packet.

Figure 16:
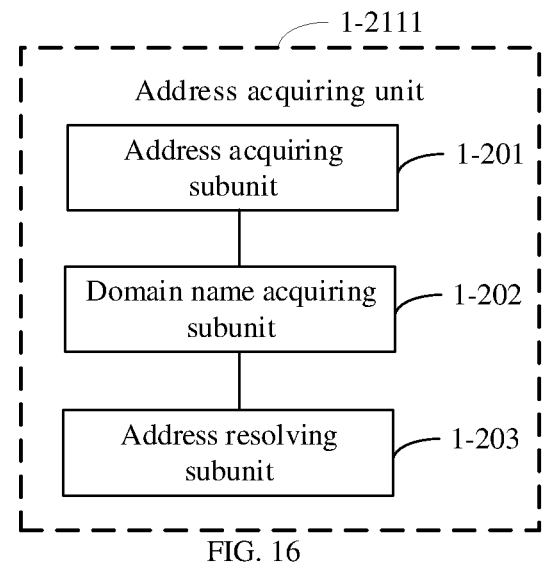
FIG. 16 is a block diagram of another application interaction apparatus according to an example of the present disclosure.

FIG. 16 is a block diagram of another application interaction apparatus according to an example. On the basis of the apparatus example shown in FIG. 15, the address acquiring unit 1-2111 may include:

an address acquiring subunit 1-201, configured to acquire an address of a virtual HTTP server from the network request;

a domain name acquiring subunit 1-202, configured to acquire a virtual domain name in the network request; and an address resolving subunit 1-203, configured to resolve an address of a corresponding virtual HTTP server according to the virtual domain name.

Figure 17:
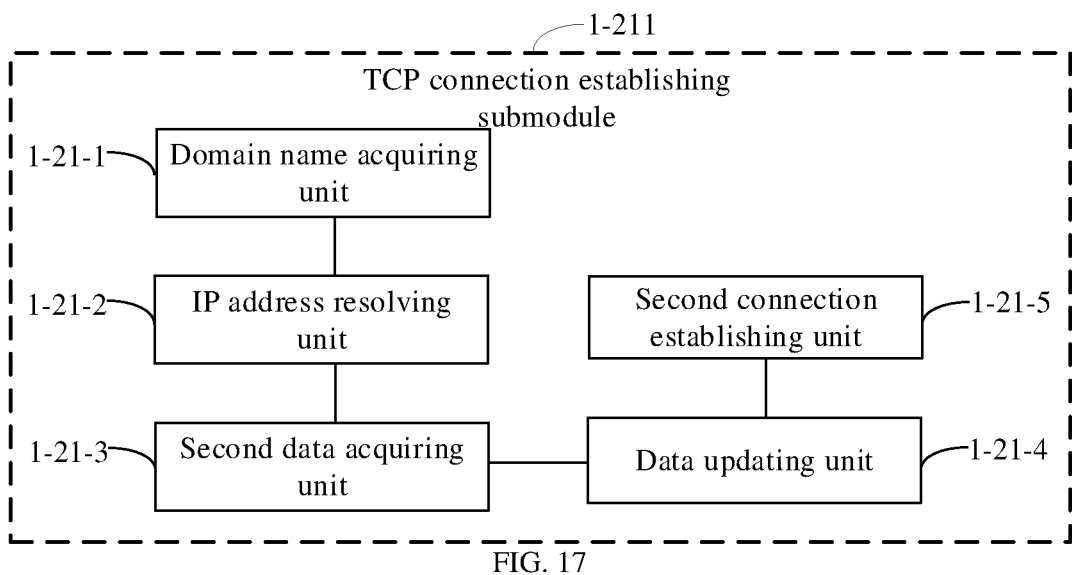
FIG. 17 is a block diagram of another application interaction apparatus according to an example of the present disclosure.

FIG. 17 is a block diagram of another application interaction apparatus according to an example. On the basis of the apparatus example shown in FIG. 14, the TCP connection establishing submodule 1-211 may include:

a domain name acquiring unit 1-21-1, configured to acquire a virtual domain name in the network request;

an IP address resolving unit 1-21-2, configured to resolve the virtual domain name into a corresponding virtual IP address;

a second data acquiring unit 1-21-3, configured to acquire a TCP handshake packet, where the TCP handshake packet include the virtual IP address;

a data updating unit 1-21-4, configured to modify the virtual IP address in the TCP handshake packet to an address of a virtual HTTP server, so as to acquire an updated handshake packet; and a second connection establishing unit 1-21-5, configured to establish a virtual TCP connection with the virtual HTTP server through the updated handshake packet.

Figure 18:
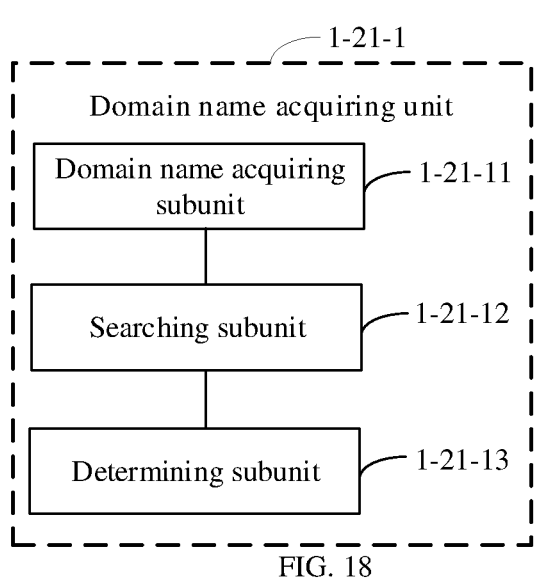
FIG. 18 is a block diagram of another application interaction apparatus according to an example of the present disclosure.

FIG. 18 is a block diagram of another application interaction apparatus according to an example. On the basis of the apparatus example shown in FIG. 17, the domain name acquiring unit 1-21-1 may include:

a domain name acquiring subunit 1-21-11, configured to acquire domain name information in an HTTP address;

a searching subunit 1-21-12, configured to search a preset white list of virtual domain names according to the domain name information; and a determining subunit 1-21-13, configured to determine, when the domain name information is in the preset white list of virtual domain names, that the domain name information is a virtual domain name.

Figure 19:
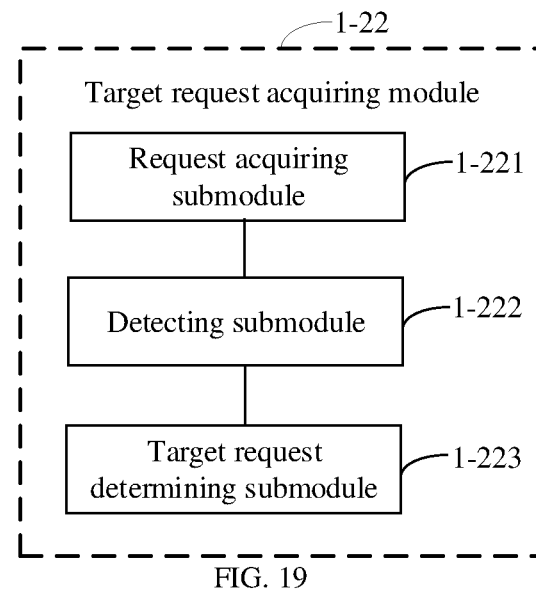
FIG. 19 is a block diagram of another application interaction apparatus according to an example of the present disclosure.

FIG. 19 is a block diagram of another application interaction apparatus according to an example. On the basis of the apparatus example shown in FIG. 13, the target request acquiring module 1-22 may include:

a request acquiring submodule 1-221, configured to acquire a network request passing through an operating system;

a detecting submodule 1-222, configured to determine whether the network request includes preset feature information; and a target request determining submodule 1-223, configured to determine, when the network request includes the preset feature information, the network request as the target network request.

Figure 20:
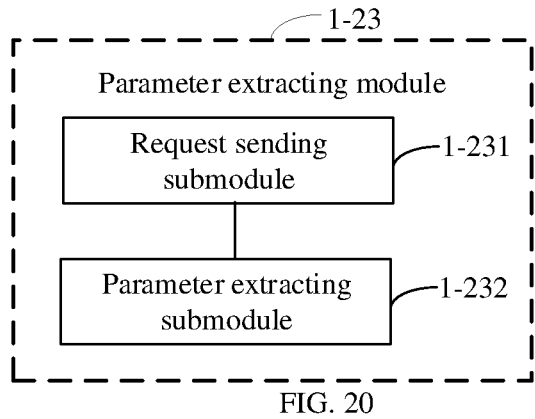
FIG. 20 is a block diagram of another application interaction apparatus according to an example of the present disclosure.

FIG. 20 is a block diagram of another application interaction apparatus according to an example. On the basis of the apparatus example shown in FIG. 13, the parameter extracting module 1-23 may include:

a request sending submodule 1-231, configured to send the target network request to the preset Message service; and a parameter extracting submodule 1-232, configured to extract the target application parameter in the target network request by the Message service.

Figure 21:
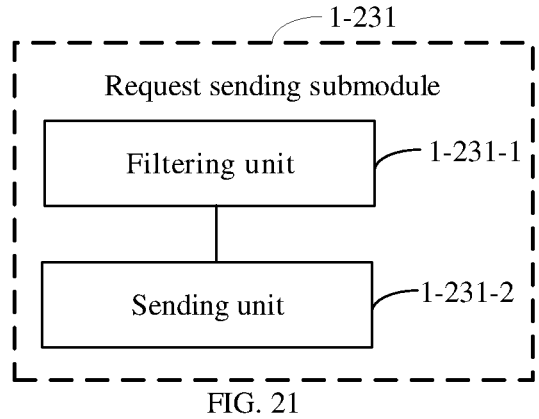
FIG. 21 is a block diagram of another application interaction apparatus according to an example of the present disclosure.

FIG. 21 is a block diagram of another application interaction apparatus according to an example. On the basis of the apparatus example shown in FIG. 20, the request sending submodule 1-231 may include:

a filtering unit 1-231-1, configured to filter out the preset feature information from the target network request, so as to acquire a filtered target network request; and a sending unit 1-231-2, configured to send the filtered target network request to the preset Message service.

Figure 22:
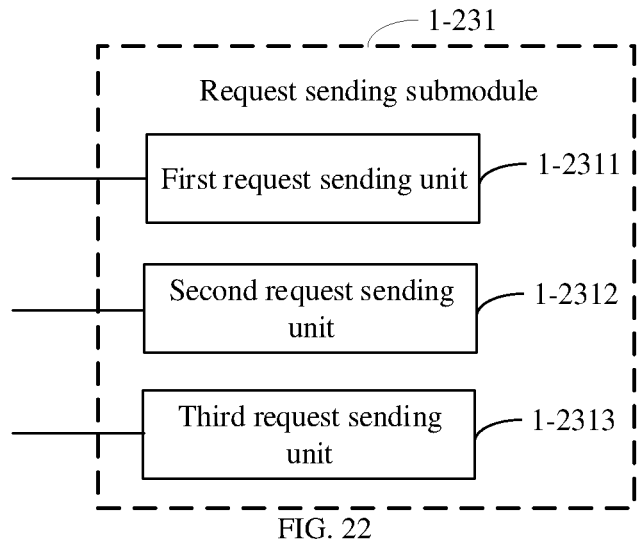
FIG. 22 is a block diagram of another application interaction apparatus according to an example of the present disclosure.

FIG. 22 is a block diagram of another application interaction apparatus according to an example. On the basis of the apparatus example shown in FIG. 20, the request sending submodule 1-231 may include:

a first request sending unit 1-2311, configured to send the target network request to the preset Message service through a preset monitoring component;

a second request sending unit 1-2312, configured to make a copy of the target network request through a preset monitoring component, and send the copy of target network request to the Message service;

a third request sending unit 1-2313, configured to send the target network request to the virtual server through the preset monitoring component, where the virtual server sends the target network request to the Message service.

In another example of the present disclosure, the monitoring component includes a firewall component.

Figure 23:
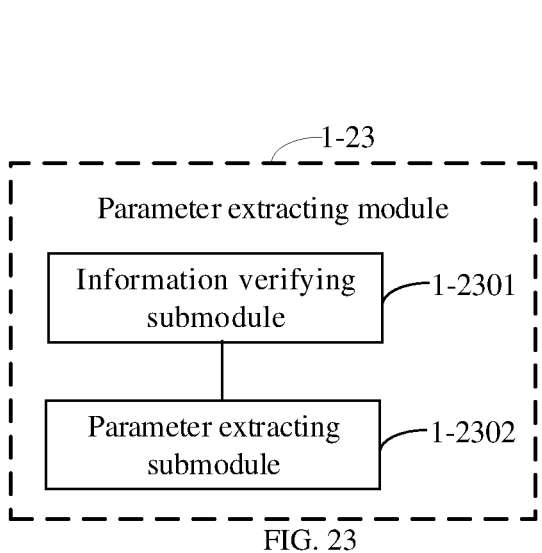
FIG. 23 is a block diagram of another application interaction apparatus according to an example of the present disclosure.

FIG. 23 is a block diagram of another application interaction apparatus according to an example. On the basis of the apparatus example shown in FIG. 13, the parameter extracting module 1-23 may include:

an information verifying submodule 1-2301, configured to perform information verification on the target network request; and a parameter extracting submodule 1-2302, configured to extract the target application parameter from the valid network request that passes the information verification.

Figure 24:
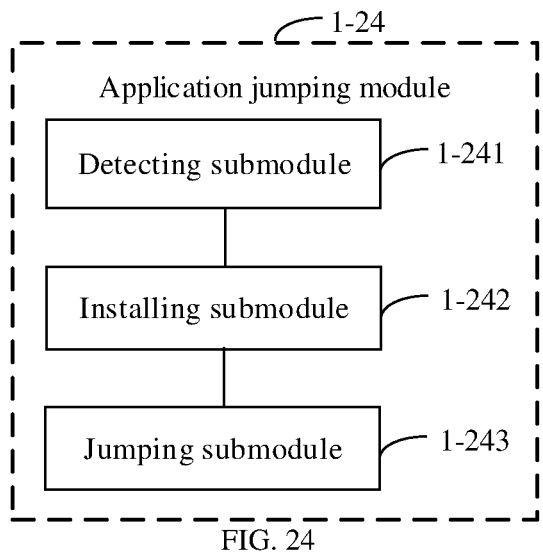
FIG. 24 is a block diagram of another application interaction apparatus according to an example of the present disclosure.

FIG. 24 is a block diagram of another application interaction apparatus according to an example. On the basis of the apparatus example shown in FIG. 13, the application jumping module 1-24 may include:

a detecting submodule 1-241, configured to determine, according to the identifier of the target application, whether the target application has been installed locally;

an installing submodule 1-242, configured to download and install, when the target application has not been installed locally, the target application; and a jumping submodule 1-243, configured to launch the target application according to the target application parameter through a preset application platform.

Since the apparatus examples basically correspond to the method examples, reference may be made to the description of the method examples for related information. The apparatus examples described above are merely illustrative, wherein the units described as separate components may or may not be physically separated, and the components displayed as units may or may not be physical units, i.e., they may be located at the same location or distributed to multiple network units. Part or all of the modules may be selected according to actual needs to achieve the purposes of the present disclosure. Those of ordinary skill in the art can understand and implement the present disclosure without any creative effort.

The present disclosure also provides an application interaction apparatus, including: a processor; and a memory for storing instructions executable by the processor, wherein the processor is configured to: establish a virtual network connection between a current application and a preset virtual server; acquire a target network request passing through an operating system by using the virtual network connection, wherein the target network request indicates a jump from the current application to a target application; extract a target application parameter from the target network request, wherein the target application parameter includes at least an identifier of the target application; and launch the target application according to the target application parameter.

Figure 25:
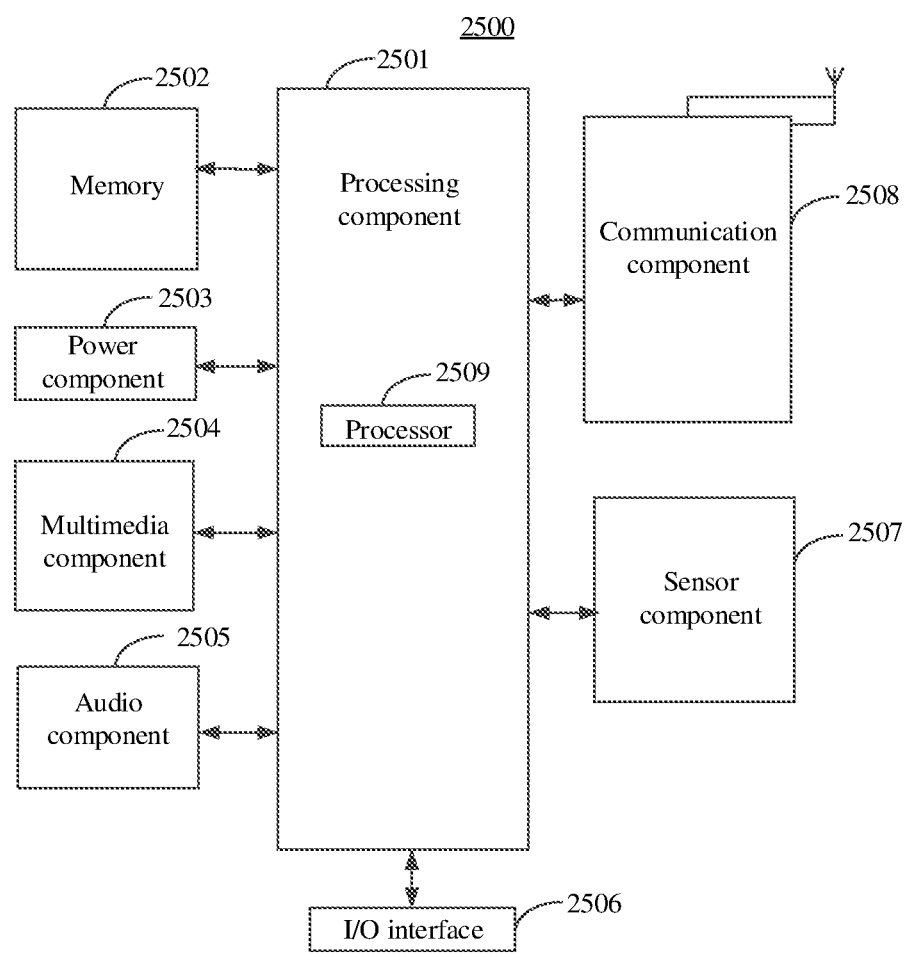
FIG. 25 is a structural diagram of an interaction apparatus according to an example of the present disclosure.

FIG. 25 is a structural diagram of an interaction apparatus 2500 according to an example. For example, the apparatus 2500 may be a user equipment, specifically a mobile phone, a computer, a digital broadcast terminal, a message sending and receiving device, a game console, a tablet device, a medical device, a fitness device, a personal digital assistant, a wearable device such as a smart watch, and smart glasses, a smart bracelet, smart running shoes, etc.

With reference to FIG. 25, the apparatus 2500 may include one or more of the following components: a processing component 2501, a memory 2502, a power component 2503, a multimedia component 2504, an audio component 2505, an input/output (I/O) interface 2506, a sensor component 2507, and a communication component 2508.

The processing component 2501 typically controls the overall operation of the apparatus 2500, such as operations associated with display, telephone calls, data communication, camera operations, and recording operations. The processing component 2501 may include one or more processors 2509 to execute instructions to perform all or part of the steps of the methods described above. Moreover, the processing component 2501 may include one or more modules to facilitate interaction between the processing component 2501 and other components. For example, the processing component 2501 may include a multimedia module to facilitate interaction between the multimedia component 2504 and the processing component 2501.

The memory 2502 is configured to store various types of data to support operation at the apparatus 2500. Examples of such data include instructions for any application or method operating on the apparatus 2500, contact data, phone book data, messages, pictures, videos, and the like. The memory 2502 can be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power component 2503 provides power to various components of the apparatus 2500. The power component 2503 may include a power management system, one or more power sources, and other components associated with generating, managing, and distributing power for the apparatus 2500.

The multimedia component 2504 includes a screen between the apparatus 2500 and the user that provides an output interface. In some examples, the screen may include a liquid crystal display (LCD) and a touch panel (TP). If the screen includes a touch panel, the screen can be implemented as a touch screen to receive input signals from the user. The touch panel includes one or more touch sensors to sense touches, slides, and gestures on the touch panel. The touch sensor described above may sense not only the boundary of the touch or slide action but also the duration and pressure associated with the touch or slide operation described above. In some embodiments, the multimedia component 2504 includes a front camera and/or a rear camera. When the apparatus 2500 is in an operation mode, such as a shooting mode or a video mode, the front camera and/or the rear camera can receive external multimedia data. Each front and rear camera can be a fixed optical lens system or have focal length and optical zoom capabilities.

The audio component 2505 is configured to output and/or input an audio signal. For example, the audio component 2505 includes a microphone (MIC) that is configured to receive an external audio signal when the apparatus 2500 is in an operational mode, such as a call mode, a recording mode, and a voice recognition mode. Audio signals received may be further stored in the memory 2502 or transmitted via the communication component 2508. In some embodiments, the audio component 2505 further includes a speaker for outputting audio signals.

The I/O interface 2506 provides an interface between the processing component 2501 and peripheral interface modules, which may be a keyboard, a click wheel, a button, or the like. These buttons may include, but are not limited to, a home button, a volume button, a start button, and a lock button.

The sensor component 2507 includes one or more sensors for providing a status assessment of various aspects to the apparatus 2500. For example, the sensor component 2507 may detect an on/off state of the apparatus 2500, relative positioning of components, where the components may be the display and keyboard of the apparatus 2500. The sensor component 2507 may also detect a change in position of the apparatus 2500 itself or a component thereof, presence or absence of user contact with the apparatus 2500, orientation or acceleration/deceleration of the apparatus 2500 and temperature change of the apparatus 2500. The sensor component 2507 may include a proximity sensor configured to detect the presence of nearby objects without any physical contact. The sensor component 2507 may also include a light sensor, such as a CMOS or CCD image sensor, for use in imaging applications. In some embodiments, the sensor component 2507 may also include an acceleration sensor, a gyro sensor, a magnetic sensor, a pressure sensor, or a temperature sensor.

The communication component 2508 is configured to facilitate wired or wireless communication between the apparatus 2500 and other devices. The apparatus 2500 can access a wireless network based on a communication standard, such as WiFi, 2G or 3G, or a combination thereof. In an example, the communication component 2508 receives broadcast signals or broadcast associated information from an external broadcast management system via a broadcast channel. In an example, the communication component 2508 may further include a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies.

In an example, the apparatus 2500 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic component for performing any of the above-described application interaction methods or interaction methods applied to a user terminal.

The present disclosure also provides a non-transitory computer readable storage medium, where the storage medium stores a computer program, and the computer program is for executing any of the above application interaction methods.

Other examples of the present disclosure will be apparent to those skilled in the art after considering the specification and implement the invention disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and examples are to be regarded as illustrative only, and true scope and spirit of the present disclosure is indicated by the claims below.

It is to be understood that the disclosure is not limited to the detailed structures described above and shown in the appended drawings, and is subject to various modifications and changed within its scope. The scope of the present disclosure is to be limited only by the appended claims.

The invention claimed is:

1. An application interaction method, comprising:
   establishing a virtual network connection between a current application and a preset virtual server;
   acquiring a target network request passing through an operating system by using the virtual network connection, wherein the target network request indicates a jump from the current application to a target application;
   extracting a target application parameter from the target network request, wherein the target application parameter includes at least an identifier of the target application; and
   launching the target application according to the target application parameter,
   wherein establishing the virtual network connection between the current application and the preset virtual server comprises:
      establishing a virtual transmission control protocol (TCP) connection between the current application and a preset virtual HTTP server; and
   acquiring the target network request passing through the operating system by using the virtual network connection comprises:
      acquiring, through the virtual TCP connection, a target HTTP request passing through the operating system, and
   establishing the virtual TCP connection between the current application and the preset virtual HTTP server comprises:
      acquiring an address of the preset virtual HTTP server according to the target network request;
      acquiring a handshake packet including an address of the preset virtual HTTP server; and
      establishing the virtual TCP connection with the preset virtual HTTP server through the handshake packet.

2. The method according to claim 1, wherein acquiring the address of the preset virtual HTTP server according to the target network request comprises one of:
   extracting the address of the preset virtual HTTP server from the target network request; or
   acquiring a virtual domain name in the target network request, and resolving the address of the preset virtual HTTP server according to the virtual domain name.

3. The method according to claim 2, wherein acquiring the virtual domain name in the target network request comprises:

acquiring domain name information in an HTTP address;
searching a preset white list of virtual domain names according to the domain name information; and
determining, when the domain name information is in the preset white list of virtual domain names, that the domain name information belongs to the virtual domain name.

4. The method according to claim 1, wherein extracting the target application parameter from the target network request comprises:
sending the target network request to a preset message service; and
extracting the target application parameter in the target network request by the message service.

5. The method according to claim 4, wherein sending the target network request to the preset message service comprises:
filtering out preset feature information from the target network request, to acquire a filtered target network request; and
sending the filtered target network request to the preset message service.

6. The method according to claim 4, wherein sending the target network request to the preset message service comprises one of:
sending the target network request to the preset message service through a preset monitoring component;
making a copy of the target network request through the preset monitoring component, and sending the copy of target network request to the preset message service; or
sending the target network request to the preset virtual server through the preset monitoring component, wherein the preset virtual server sends the target network request to the message service.

7. The method according to claim 6, wherein the preset monitoring component includes a firewall component.

8. An application interaction method, comprising:
establishing a virtual network connection between a current application and a preset virtual server;
acquiring a target network request passing through an operating system by using the virtual network connection, wherein the target network request indicates a jump from the current application to a target application;
extracting a target application parameter from the target network request, wherein the target application parameter includes at least an identifier of the target application; and
launching the target application according to the target application parameter,
wherein establishing the virtual network connection between the current application and the preset virtual server comprises:
establishing a virtual transmission control protocol (TCP) connection between the current application and a preset virtual HTTP server; and
acquiring the target network request passing through the operating system by using the virtual network connection comprises:
acquiring, through the virtual TCP connection, a target HTTP request passing through the operating system, and
establishing the virtual TCP connection between the current application and the preset virtual HTTP server comprises:
acquiring a virtual domain name in the target network request;
resolving the virtual domain name into a corresponding virtual internet protocol (IP) address;
acquiring a TCP handshake packet including the virtual IP address;
modifying the virtual IP address in the TCP handshake packet to an address of the preset virtual HTTP server, to acquire an updated handshake packet; and
establishing the virtual TCP connection with the preset virtual HTTP server through the updated handshake packet.

9. An application interaction apparatus, comprising:
a processor; and
a memory for storing instructions executable by the processor,
wherein the processor is configured to:
establish a virtual network connection between a current application and a preset virtual server;
acquire a target network request passing through an operating system by using the virtual network connection, wherein the target network request indicates a jump from the current application to a target application;
extract a target application parameter from the target network request, wherein the target application parameter includes at least an identifier of the target application; and
launch the target application according to the target application parameter,
wherein establishing the virtual network connection between the current application and the preset virtual server comprises:
establishing a virtual transmission control protocol (TCP) connection between the current application and a preset virtual HTTP server; and
acquiring the target network request passing through the operating system by using the virtual network connection comprises:
acquiring, through the virtual TCP connection, a target HTTP request passing through the operating system, and
establishing the virtual TCP connection between the current application and the preset virtual HTTP server comprises:
acquiring an address of the preset virtual HTTP server according to the target network request;
acquiring a handshake packet including an address of the preset virtual HTTP server; and
establishing the virtual TCP connection with the preset virtual HTTP server through the handshake packet.

10. The apparatus according to claim 9, wherein in acquiring the address of the preset virtual HTTP server according to the target network request, the processor is further configured to perform one of:
extracting the address of the preset virtual HTTP server from the target network request; or
acquiring a virtual domain name in the target network request, and resolving the address of the preset virtual HTTP server according to the virtual domain name.

11. The apparatus according to claim 10, wherein in acquiring the virtual domain name in the target network request, the processor is further configured to:
acquire domain name information in an HTTP address;
search a preset white list of virtual domain names according to the domain name information; and determine, when the domain name information is in the preset white list of virtual domain names, that the domain name information belongs to the virtual domain name.

12. The apparatus according to claim 9, wherein in extracting the target application parameter from the target network request, the processor is further configured to:

send the target network request to a preset message service; and extract the target application parameter in the target network request by the message service.

13. The apparatus according to claim 12, wherein in sending the target network request to the preset message service, the processor is further configured to:

filter out preset feature information from the target network request, to acquire a filtered target network request; and send the filtered target network request to the preset message service.

14. The apparatus according to claim 12, wherein in sending the target network request to the preset message service, the processor is further configured to perform one of:

sending the target network request to the preset message service through a preset monitoring component;

making a copy of the target network request through the preset monitoring component, and sending the copy of target network request to the preset message service; or sending the target network request to the preset virtual server through the preset monitoring component, wherein the preset virtual server sends the target network request to the message service.

15. The apparatus according to claim 14, wherein the preset monitoring component includes a firewall component.

* * * * *